United States Patent Office 2,735,834
Patented Feb. 21, 1956

2,735,834

ACRYLONITRILE POLYMERS STABILIZED WITH CERTAIN BETA-ALKYLAMINOPROPIONITRILES

George W. Stanton and Forrest A. Ehlers, Walnut Creek, Calif., assignors to The Dow Chemical Company, Midland, Mich., a corporation of Delaware No Drawing. Application June 2, 1954,
Serial No. 434,068

4 Claims. (Cl. 260—45.9)

This invention relates to compositions of matter consisting essentially of a polymer containing at least 60 per cent of acrylonitrile in the polymer molecule, and a stabilizing agent to protect the polymer from the embrittling or discoloring effects of exposure to light or heat.

Polyacrylonitrile and copolymers containing acrylonitrile as the predominant constituent undergo undesirable physical changes upon prolonged exposure to light or to heat. The observable symptoms of such changes are embrittlement or discoloration, or both, due, in varying measure to the action of either light or heat. Since the uses to which such polymers are put include the manufacture of molded articles and thin films, either embrittlement or discoloration is to be avoided, if possible. To this end, it would be desirable to provide agents which can be admixed with the polymers to protect them against one or more of the adverse effects of the conditions to which they may be exposed. The provision of stabilized compositions of the polymers and such protective agents is the principal object of the present invention.

This object is realized, according to the invention, by mixing with the polymer from 1 to 20, and preferably from 5 to 15 per cent by weight of a beta-alkyl-aminopropionitrile having the general formula

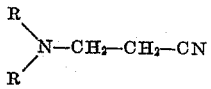

wherein one R is selected from the group consisting of hydrogen and alkyl groups containing from 1 to 4 carbon atoms, and the other R is such an alkyl group. Articles made from the resulting compositions show little or no tendency to discolor upon prolonged exposure to ultraviolet light, and exhibit little of the tendency to become brittle as a result of such exposure, especially when the stabilizer is present at concentrations of 5 per cent or more.

A copolymer of 80 per cent acrylonitrile and 20 per cent isobutylene was prepared in aqueous emulsion, the polymeric particles were coagulated by addition of magnesium chloride solution, and the coagulum was washed and dried. This copolymer was found to be soluble to the extent of over 15 per cent by weight in acetone. In evaluating the various stabilizers, a 15 per cent solution of the copolymer in acetone was prepared, an amount of stabilizer equal to 15 per cent of the weight of copolymer was dissolved in the solution, and films were cast from the solution on glass plates. The films were dried in air overnight, then at 70° C. for one hour. The resulting films were mounted near the rim of a horizontal turntable, with half of the film covered and the other half exposed. The turntable was set in motion in a Fadeometer, and the exposed films were irradiated for 120 hours. The several films were then tested with a photoelectric reflection meter which had been set to read 100 when turned toward a glazed white tile (see footnote). An exposed but untreated film of the copolymer gave readings of about 70 and had a light tan color, while the covered and unexposed portions of all the films gave readings of 90 to 96, using the white tile standard as a background.

NOTE.—In the Fadeometer employed, two type S–4 General Electric Sunlight lamps are disposed horizontally and parallel to one another, with the centers of the bulbs 4 inches apart, at a height 5.75 inches above, and displaced 6 inches from the center of a 12-inch turntable driven at 33⅓ revolutions per minute. The reflection meter used is a Model 610, made by the Photovolt Corporation, 95 Madison Ave., New York city, having a tristimulus blue filter and set to read 100 when turned toward a color-standard white ceramic "Vitrolite" tile supplied by Gardner Laboratories, Bethesda, Maryland.

Results with typical compounds in the recited class are given below:

| Test Compound | Reflection meter reading after 120 hrs. in Fadeometer | Brittleness |
|---|---|---|
| (Stabilizers): | | |
| None | about 70 | Brittle. |
| Beta-dimethylaminopropionitrile | about 90 | None. |
| Beta-ethylaminopropionitrile | do | Do. |
| Beta-diethylaminopropionitrile | do | Do. |
| Beta-isopropylaminopropionitrile | do | Do. |
| Beta-n-butylaminopropionitrile | do | Do. |
| For contrast (non-stabilizers): | | |
| 1,2-dichloropropionitrile | about 70 | Brittle. |
| Stearonitrile | under 70 | Do. |
| Acetonitrile | about 70 | Do. |
| Beta-chloropropionitrile | under 70 | Do. |
| Beta-hydroxypropionitrile | about 70 | Do. |
| Methylaminodiacetonitrile | do | Do. |

Tests have shown that the new compositions require at least 1 per cent of the stabilizer to obtain protection from the effects of light, and that samples containing 5 per cent or more are non-brittle, or much less brittle than those containing no stabilizer or smaller amounts of the same stabilizer.

The problem is not limited to the homopolymer of acrylonitrile, or to the specific copolymer of the example, and it has been found that the stabilizers of the present invention are effective, as well, when incorporated in such acrylonitrile copolymers as 60-40 acrylonitrile/methyl acrylate; 86-10-4 acrylonitrile/isobutylene/allyl alcohol; 62.5-37.5 acrylonitrile/vinyl acetate and 95-5 acrylonitrile/2-vinyl pyridine.

We claim:

1. A composition of matter the essential constituents of which are a polymeric body containing at least 60 per cent by weight of acrylonitrile in the polymer molecule and, as a stabilizing agent therefor, from 1 to 20 per cent by weight of a compound having the general formula

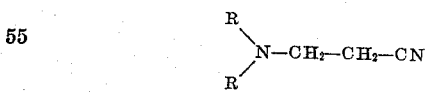

wherein one R is an alkyl group containing from 1 to 4 carbon atoms and the other R is selected from the class consisting of the same alkyl group and hydrogen.

2. The composition claimed in claim 1, wherein the stabilizer is present in amount of 5 to 15 per cent of the weight of the polymer.

3. The composition claimed in claim 1, wherein the stabilizing agent is beta-dimethylaminopropionitrile.

4. The composition claimed in claim 1, wherein the stabilizing agent is beta-isopropylaminopropionitrile.

References Cited in the file of this patent

UNITED STATES PATENTS 2,607,752    Crouch _____ Aug. 19, 1952